(12) United States Patent
McFarland

(10) Patent No.: US 8,563,064 B1
(45) Date of Patent: Oct. 22, 2013

(54) CORRUGATED CRUST

(76) Inventor: Kirt McFarland, Mesa, AZ (US)

(*) Notice: Subject to any disclaimer, the term of this patent is extended or adjusted under 35 U.S.C. 154(b) by 0 days.

(21) Appl. No.: 13/014,710

(22) Filed: Jan. 26, 2011

(51) Int. Cl.
*A21D 13/08* (2006.01)
*A21D 13/00* (2006.01)
*A23L 1/216* (2006.01)

(52) U.S. Cl.
USPC ............................ 426/556; 426/144; 426/391

(58) Field of Classification Search
USPC ........................................ 426/556, 391, 144
See application file for complete search history.

(56) References Cited

U.S. PATENT DOCUMENTS

| | | | |
|---|---|---|---|
| 4,111,624 A | 9/1978 | Hanson | |
| 4,876,934 A | 10/1989 | Fagan et al. | |
| 5,417,150 A | 5/1995 | Kordic | |
| 5,440,974 A | 8/1995 | Ueno et al. | |
| 5,538,744 A | 7/1996 | Miller et al. | |
| 5,614,237 A | 3/1997 | Clow et al. | |
| 5,935,629 A | 8/1999 | Martin | |
| 6,280,783 B1 | 8/2001 | Blaschke et al. | |
| 6,398,539 B1 | 6/2002 | Lawrence | |
| 6,783,782 B1 | 8/2004 | Larsen et al. | |
| 6,953,596 B2 | 10/2005 | Maniak et al. | |
| 7,316,556 B2 | 1/2008 | Maniak et al. | |
| 2004/0083902 A1* | 5/2004 | Gaskill et al. | ............... 99/421 R |
| 2004/0151807 A1 | 8/2004 | Damsgard | |
| 2004/0175453 A1 | 9/2004 | Baeten et al. | |
| 2009/0181135 A1 | 7/2009 | Domingues et al. | |
| 2009/0208613 A1* | 8/2009 | Waller | ........................ 426/106 |

* cited by examiner

*Primary Examiner* — D. Lawrence Tarazano
*Assistant Examiner* — Katherine DeGuire
(74) *Attorney, Agent, or Firm* — Booth Udall Fuller, PLC

(57) ABSTRACT

Disclosed is a proofed, cooked corrugated dough crust. The crust may include a top surface. Opposite the top surface is a bottom surface intended to be in contact with rollers of a roller grill. The bottom surface defines at least one parallel groove or at least one parallel ridge or both. A roller grill system for a proofed, cooked corrugated dough crust is also disclosed. The system may include a roller grill including a plurality of parallel rollers and spaces in an alternating series. At least one corrugated crust is also included. Any grooves rest on top of the rollers and any ridges are in the spaces between the rollers. A forming assembly system for proofing and cooking a corrugated dough crust is also disclosed.

15 Claims, 3 Drawing Sheets

CORRUGATED CRUST

BACKGROUND

1. Technical Field

This document relates to a corrugated crust and forming assembly for the same and a corrugated crust roller grill system.

2. Background

Roller grills exist and are common in, but not limited to, self-serve locations such as convenient stores because they can provide a flexible work environment with the capability to serve from both sides and can cook items in approximately 10-15 minutes. The items can then remain rolling on the roller grill and picked up by a consumer without having to wait. Some feature, for example, stainless steel rollers and a body, one or more separate on/off switches to operate front rollers and/or rear rollers and one or more separate variable heat controls. However, current roller grills are limited to the food items they can cook and/or reheat, namely cylindrical food items such as hot dogs, burritos, egg rolls, corn dogs, rolled tacos, and the like, positioned between rollers so that they do not "roll" off the end of the grill, but roll in place.

SUMMARY

Aspects of this document relate to a corrugated crust and a roller grill system. These aspects may comprise, and implementations may include, one or more or all of the components and steps set forth in the appended CLAIMS, which are hereby incorporated by reference.

In one aspect, a proofed, cooked corrugated dough crust is disclosed. The corrugated crust may include a top surface. Opposite the top surface is a bottom surface intended to be in contact with rollers of a roller grill. The bottom surface may define at least two parallel grooves separated by at least one parallel ridge, or at least two parallel ridges separated by at least one parallel groove, or at least one parallel ridge.

Particular implementations may include one or more or all of the following.

The crust may have a circular shape.

The grooves and the ridges may include a plurality of parallel grooves and ridges in an alternating series.

The spacing between parallel grooves is about one inch to about one and three-quarters of an inch and spacing between parallel ridges is about one inch to about one and three-quarters of an inch.

The grooves may extend about one quarter to about one half the way to the top surface of the crust.

The top surface may include at least one outer edge defining a recess.

In another aspect, a forming assembly system for proofing and cooking a corrugated dough crust is disclosed. The corrugated crust forming assembly may include a forming assembly including: at least one cross member; at least one parallel tube coupled to or integral with the at least one cross member separated by at least one parallel space; and at least one plate opposing the at least one parallel tube. A corrugated crust may be in between the at least one parallel tube and the at least one plate. The crust may include a top surface in contact the at least one plate and an opposing bottom surface in contact with the at least one parallel tube. The bottom surface may define at least two parallel grooves separated by at least one parallel ridge, or at least two parallel ridges separated by at least one parallel groove, or at least one parallel ridge. The parallel grooves form adjacent the tubes and the ridges extend in spaces between the tubes.

Particular implementations may include one or more or all of the following.

Spacing between parallel grooves may be about one inch to about one and three-quarters of an inch.

At least one of the tubes may include at least one protrusion that stops the tubes from contacting the at least one plate so that the crust can have a thickness.

The grooves may extend about one quarter to about one half the way to the top surface of the crust.

The crust may have a circular shape, the plate may be smaller in diameter than the crust, and the top surface may include at least one outer edge defining a recess formed by the plate.

In still another aspect, a roller grill system for a proofed, cooked corrugated dough crust is disclosed. The corrugated crust roller grill system may include a roller grill including a plurality of parallel rollers and spaces in an alternating series. At least one corrugated crust is also included that has a top surface and an opposing bottom surface in contact with the rollers of the roller grill. The bottom surface may define at least two parallel grooves separated by at least one parallel ridge, or at least two parallel ridges separated by at least one parallel groove, or at least one parallel ridge. The parallel grooves rest on top of the rollers and the parallel ridges extend in spaces between the rollers.

Particular implementations may include one or more or all of the following.

The crust may have a circular shape.

The at least two parallel grooves and the at least one parallel ridge may include a plurality of parallel grooves and ridges in an alternating series.

The spacing between parallel grooves is about one inch to about one and three-quarters of an inch and spacing between parallel ridges is about one inch to about one and three-quarters of an inch.

The at least two parallel grooves may extend about one quarter to about one half the way to the top surface of the crust.

The top surface may include at least one outer edge defining a recess.

The at least one parallel ridge may extend into the space between the two adjacent rollers about one quarter to about one half of a diameter of a roller.

The foregoing and other aspects and implementations of a corrugated crust and a roller grill system may have one or more or all of the following advantages, as well as other benefits discussed elsewhere in this document.

Corrugated crusts allow for a wider variety of food items to be cooked and/or reheated with a roller grill, besides just cylindrical items. Any relatively flat food item employing a cooked corrugated dough crust can be cooked and/or reheated on a roller grill, such as pizzas, pastries, pies, hamburgers, sandwiches, tortas, tostadas, foccacia, flat breads, and the like. They will not slide off of the roller grill when placed on it, but will stay where they are set.

The foregoing and other aspects, features, and advantages will be apparent to those of ordinary skill in the art from the DESCRIPTION and DRAWINGS, and from the CLAIMS.

BRIEF DESCRIPTION OF DRAWINGS

Implementations will hereinafter be described in conjunction with the appended DRAWINGS (which are not necessarily to scale), where like designations denote like elements, and.

DESCRIPTION

This document features a corrugated crust and forming assembly for the same and a corrugated crust roller grill system. There are many features of the foregoing disclosed herein, of which one, a plurality, or all features or steps may be used in any particular implementation.

In the following description, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

In describing implementations, the following terminology will be used in accordance with the definitions and explanations set out below. Notwithstanding, other terminology, definitions, and explanations may be found throughout this document as well.

"Corrugated" (or the synonyms furrowed, channeled, ridged, grooved, etc.) as used herein refers to any alternating series of any number of parallel grooves and/or ridges. For example, one groove or one ridge would still be considered corrugated, or one ridge and two grooves or one groove and two ridges would still be considered corrugated.

"Proofed" as used herein refers to prepared dough that is allowed to rise, in a forming assembly, substantially filling the forming assembly, to create a top surface and a bottom surface on the dough, and to impart the desired texture and thickness attributes of the dough (and hence the eventual baked crust).
Structure and System There are a variety of proofed, cooked corrugated dough crust implementations for use with a roller grill. Generally, the corrugated crust may include a top surface. Opposite the top surface is a bottom surface intended to be in contact with rollers of a roller grill. The bottom surface may define at least two parallel grooves separated by at least one parallel ridge, or at least two parallel ridges separated by at least one parallel groove, or at least one parallel ridge.

Figure 1:
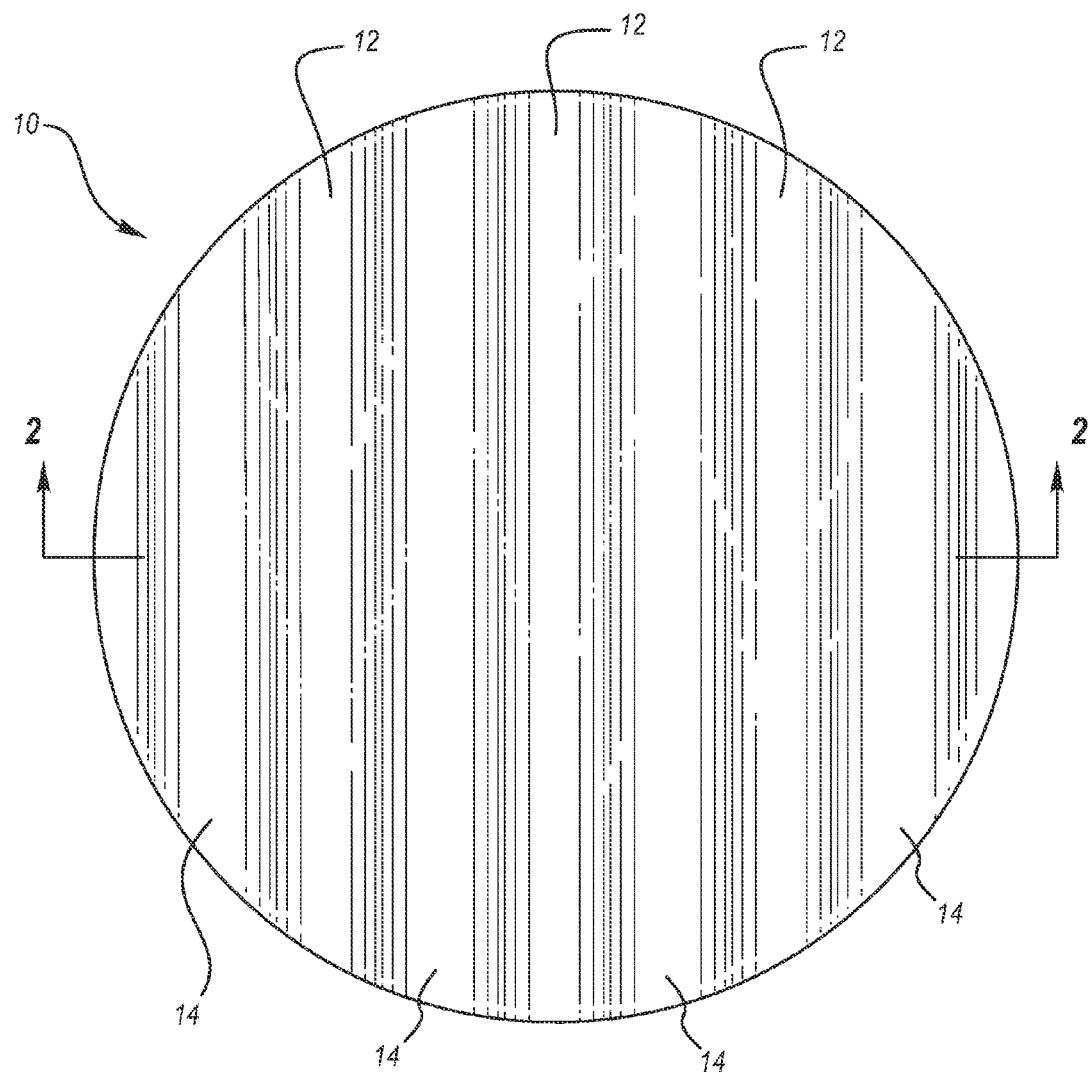
FIG. 1 is a bottom view of an implementation of a corrugated crust.
Figure 2:
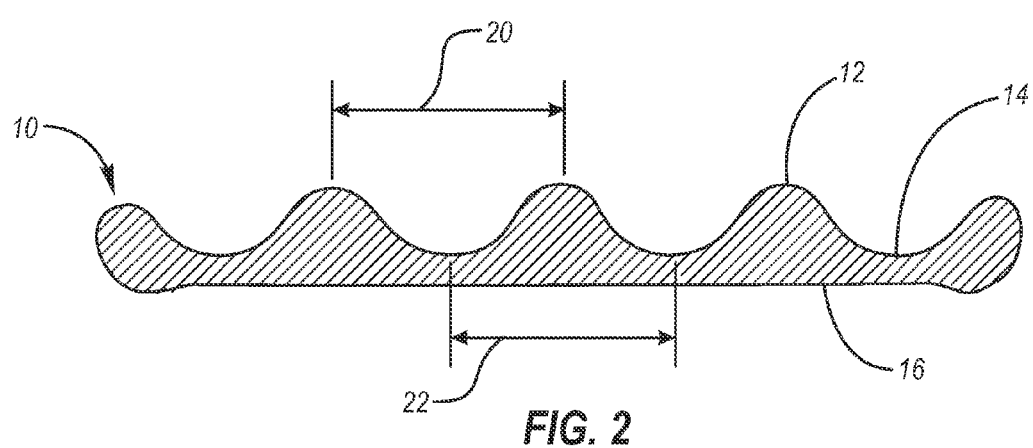
FIG. 2 is a cross-sectional side view of the corrugated crust implementation of FIG. 1 taken along line 2-2 of FIG. 1.

Notwithstanding, turning to FIGS. 1-2 and for the exemplary purposes of this disclosure, proofed, cooked corrugated dough crust 10 is shown. Proofed, cooked corrugated dough crust 10 may be a proofed, cooked pizza crust for example.

Crust 10 includes a top surface. Opposite the top surface is a bottom surface intended to be in contact with rollers of a roller grill. The bottom surface defines a plurality of parallel grooves 14 separated by parallel ridges 12 in an alternating series.

The crust may have any rectilinear or curvilinear shape. For, example, if the crust 10 is a pizza crust for example, crust 10 may have a circular, rectangular, or square shape. The top surface may include at least one outer edge defining a recess 16. Recess 16 could provide a surface to maintain toppings for example, like pizza toppings or glaze or torta or tostada toppings for example. For a circular or other curvilinear shaped crust, there might be just one edge. For rectilinear shaped crusts, there might be three or more edges (e.g., three edges for a triangular shaped crust or four edges for a square or rectangular shaped crust).

The spacing 22 between parallel grooves 14 may be any spacing that matches or corresponds to the spacing of rollers on a roller grill. For example, the spacing 22 between parallel grooves 14 may be about one inch to about one and three-quarters of an inch and spacing 20 between parallel ridges 12 may be about one inch to about one and three-quarters of an inch. In particular implementations, the spacing 22 between parallel grooves 14 may be about one and one-quarter of an inch to about one and one-half of an inch and spacing 20 between parallel ridges 12 may be one and one-quarter of an inch to about one and one-half of an inch. The spaces 22 between grooves 14 and the spaces 20 between ridges 12 do not have to be equal.

The parallel grooves 14 may extend about one quarter to about three quarters of the thickness of the crust 10. In particular implementations the parallel grooves 14 may extend about one half of the thickness of the crust 10.

There are a variety of roller grill system implementations that provide for a proofed, cooked corrugated dough crust. A corrugated crust roller grill system may generally include a roller grill including a plurality of parallel rollers (e.g., stainless steel) and spaces in an alternating series. The roller grill may also feature, for example, a body, separate on/off switch(es) to operate front rollers or rear rollers and separate variable heat control(s). At least one corrugated crust is also included in the system that includes a top surface and an opposing bottom surface in contact with the rollers of the roller grill. The bottom surface may define at least two parallel grooves separated by at least one parallel ridge, or at least two parallel ridges separated by at least one parallel groove, or at least one parallel ridge. The parallel grooves rest on top of the rollers and the parallel ridges extend in spaces between the rollers.

Figure 5:
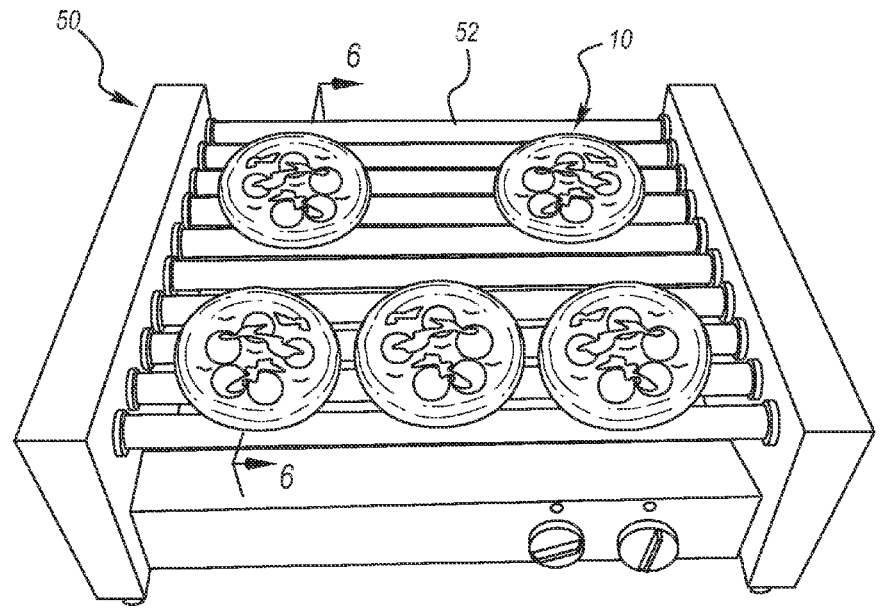
FIG. 5 is a top perspective view of an implementation of a corrugated crust roller grill system.
Figure 6:
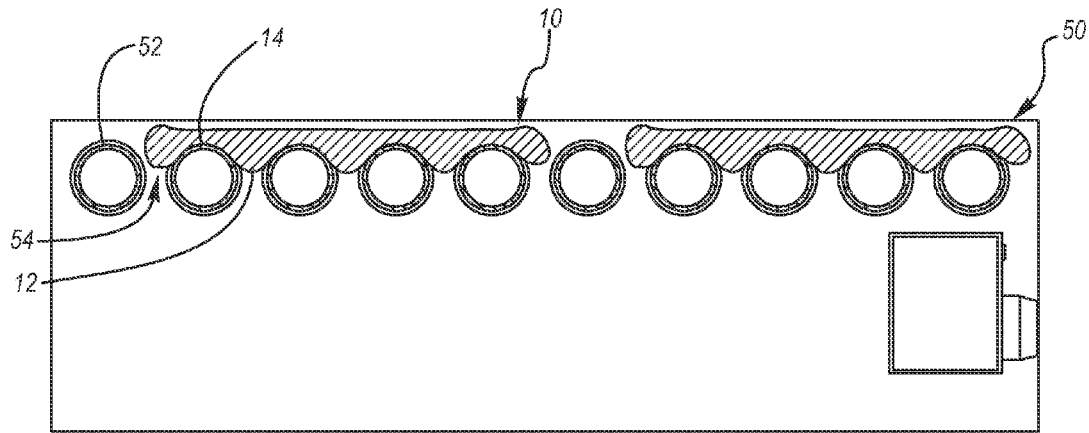
FIG. 6 is a cross-sectional side view of the corrugated crust roller grill system implementation of FIG. 6 taken along line 6-6 of FIG. 5.

Notwithstanding, turning to FIGS. 5-6 and for the exemplary purposes of this disclosure, roller grill system 50 is shown. Roller grill system 50 may cook and/or reheat any number of proofed, cooked corrugated dough crusts 10, which may be proofed, cooked pizza crusts for example as depicted. Pizza is a food product that continues to increase in popularity and in the varieties of pizzas that are available. However, until this disclosure, there were limited ways to provide pizzas to consumers in convenience stores for example. Some stores have stand alone ovens or microwaves that you have to cook the frozen pizzas in. But this takes time for a consumer and often does not produce an appetizing pizza that is crisp or cooked evenly, etc. Now, with the present disclosure, for the first time pizzas can be offered and provided at self-serve locations like convenient stores on very convenient roller grills. The pizzas "stay" on the roller grill and can cook and/or re-heat in a matter of minutes, evenly heating the bottom surface of the pizza. Then the pizzas can just remain rolling in place on the roller grill waiting to be picked up by a consumer without having to wait.

Roller grill system 50 includes including a plurality of parallel rollers 52 and spaces 54 in an alternating series. Corrugated crusts 10 are also included each having a top surface and an opposing bottom surface in contact with the rollers 52 of the roller grill. The bottom surface may define parallel grooves 14 separated by parallel ridges 12. The parallel grooves 14 rest on top of the rollers 52 and the parallel ridges 12 extend in spaces 54 between the rollers 52. In this manner, the pizzas with crusts 10 having grooves 14 and ridges 12 extending in the spaces 54 between rollers 52 will not roll off of the roller grill when placed on it, but will remain where they are set rolling in place on the roller grill.

Other Implementations

Many additional implementations are possible.

For the exemplary purposes of this disclosure, although there are a variety of roller grill system implementations, one such implementation may be a modification to a roller grill itself rather than to the bottom surface of a crust. For example, retaining members (e.g., flat bars) may be used a top the rollers (held in position slightly above the rollers so the rollers can still turn beneath) to form a grid pattern framework of bars—some of the bars running perpendicular to the rollers and some bars running parallel to the rollers for example. The crossing bars form cages or enclosures there between that can keep any flat crust on a roller grill. Flat crusts would have the tendency to roll off of the roller grill as the rollers turn, but now they are held in place on the rollers as they turn within the confines of the cages or enclosures. The cages or enclosures may be any size and number depending on the surface area of the roller grill, the size of crusts, and the like. Alternatively, rather than a grid pattern framework of bars, only bars that run horizontally and parallel with the rollers can be used. Since the direction a flat crust would roll of the roller grill would be perpendicular to the rollers, the horizontal bars would stop any crust as well. Again, there can be any number of horizontal bars used a top the rollers depending on how many sections you want to divide the roller grill into, and the like. For example, there could be just one horizontal bar across the front edge of the roller grill.

Further implementations are within the CLAIMS.

Specifications, Materials, Assembly, and Manufacture

It will be understood that implementations are not limited to the specific components disclosed herein, as virtually any components consistent with the intended operation of a corrugated crust forming assembly implementation and/or corrugated crust roller grill system implementation may be utilized. Accordingly, for example, although particular components and so forth, are disclosed, such components may comprise any shape, size, style, type, model, version, class, grade, measurement, concentration, material, weight, quantity, and/or the like consistent with the intended operation of a corrugated crust forming assembly implementation and/or corrugated crust roller grill system implementation. Implementations are not limited to uses of any specific components, provided that the components selected are consistent with the intended operation of a corrugated crust forming assembly implementation and/or corrugated crust roller grill system implementation.

Accordingly, the components defining any corrugated crust forming assembly implementation and/or corrugated crust roller grill system implementation may be formed of any of many different types of materials or combinations thereof that can readily be formed into shaped objects provided that the components selected are consistent with the intended operation of a corrugated crust forming assembly implementation and/or corrugated crust roller grill system implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Various corrugated crust forming assembly implementations and/or corrugated crust roller grill system implementations may be manufactured using conventional procedures as added to and improved upon through the procedures described here. Some components defining corrugated crust forming assembly implementations and/or corrugated crust roller grill system implementations may be manufactured simultaneously and integrally joined with one another, while other components may be purchased pre-manufactured or manufactured separately and then assembled with the integral components.

Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of corrugated crust forming assembly implementations and/or corrugated crust roller grill system implementations are not limited to the specific order of steps as disclosed in this document. Any steps or sequence of steps of the assembly of such implementations indicated herein are given as examples of possible steps or sequence of steps and not as limitations, since various assembly processes and sequences of steps may be used to assemble such implementations.

In general, making a proofed, frozen corrugated cooked dough crust as described earlier may include: proofing a dough piece having a top surface and a bottom surface intended to be in contact with a roller grill; baking the proofed dough; and imparting a plurality of grooves on the bottom surface of the dough. The dough may be frozen before or after the grooves are imparted to the bottom surface of the dough. Baking the proofed dough may be after the grooves are imparted to the bottom surface of the dough. Imparting a plurality of grooves on the bottom surface of the dough may be done during the proofing stage.

For the exemplary purposes of this disclosure, for pizza dough, a dough piece may be prepared from any pizza dough formula. The prepared dough may then be placed in a forming assembly and proofed, or allowed to rise, in and around the assembly, substantially filling the assembly. This proofing step imparts the desired texture and thickness attributes of the dough (and the eventual baked crust). Either simultaneously or after the forgoing proofing step the top surface of the dough may be shaped to accommodate pizza or other toppings or fillings. The proofed dough is then at least partially baked in the forming assembly to set the dough. The proofed cooked dough crust can then removed from the forming assembly, frozen, packaged, and stored or distributed under frozen conditions.

The grooves and ridges can be imparted to the bottom surface of the dough prior to freezing the dough, such as during the proofing stage prior to baking. The baking step acts to "set" the grooves and ridges in the dough piece, so the grooves and ridges can maintain the crust on a roller grill during the reheating or re-baking by the consumer. Because a proofed dough piece is relatively delicate, dough that is proofed and baked in contact with the forming assembly is a very convenient way of imparting grooves and ridges to the dough.

In conjunction with proofing and baking, the dough piece can be placed on/under a forming assembly having ridges, etc. corresponding to the grooves to be imparted to the dough piece. Then, after proofing on/under the forming assembly, the proofed dough can be baked in conjunction with the forming assembly. Then the forming assembly can be removed prior to freezing and further processing. After that, all that remains is to remove the cooked dough crust from the forming assembly and freeze and further process it.

Alternatively, the grooves can be cut or notched into the proofed cooked dough crust after it has been frozen, prior to packaging the dough crust.

The end consumer can then remove a proofed, frozen cooked dough crust from the freezer without needing to thaw the crust, place it on a roller grill with the grooved bottom surface of the crust in contact with the rollers, apply toppings or fillings to the top surface of the crust if desired and not already present, and bake again or re-heat the crust to provide a crust for consumption. The grooves and ridges on the bottom surface of the crust keep the crust on the roller grill, so that the crust does not roll off of the roller grill.

Thus, to form a corrugated crust as described previously, there are a variety of forming assembly implementations that provide for the proofing and cooking of a corrugated dough crust. In general, a forming assembly system for proofing and cooking a corrugated dough crust may include a forming assembly including: at least one cross member; at least one parallel tube coupled to or integral with the at least one cross member separated by at least one parallel space; and at least one plate opposing the at least one parallel tube. A corrugated crust may be in between the at least one parallel tube and the at least one plate. The crust may include a top surface in contact the at least one plate and an opposing bottom surface in contact with the at least one parallel tube. The bottom surface may define at least two parallel grooves separated by at least one parallel ridge, or at least two parallel ridges separated by at least one parallel groove, or at least one parallel ridge. The parallel grooves form adjacent the tubes and the ridges extend in spaces between the tubes.

Figure 3:
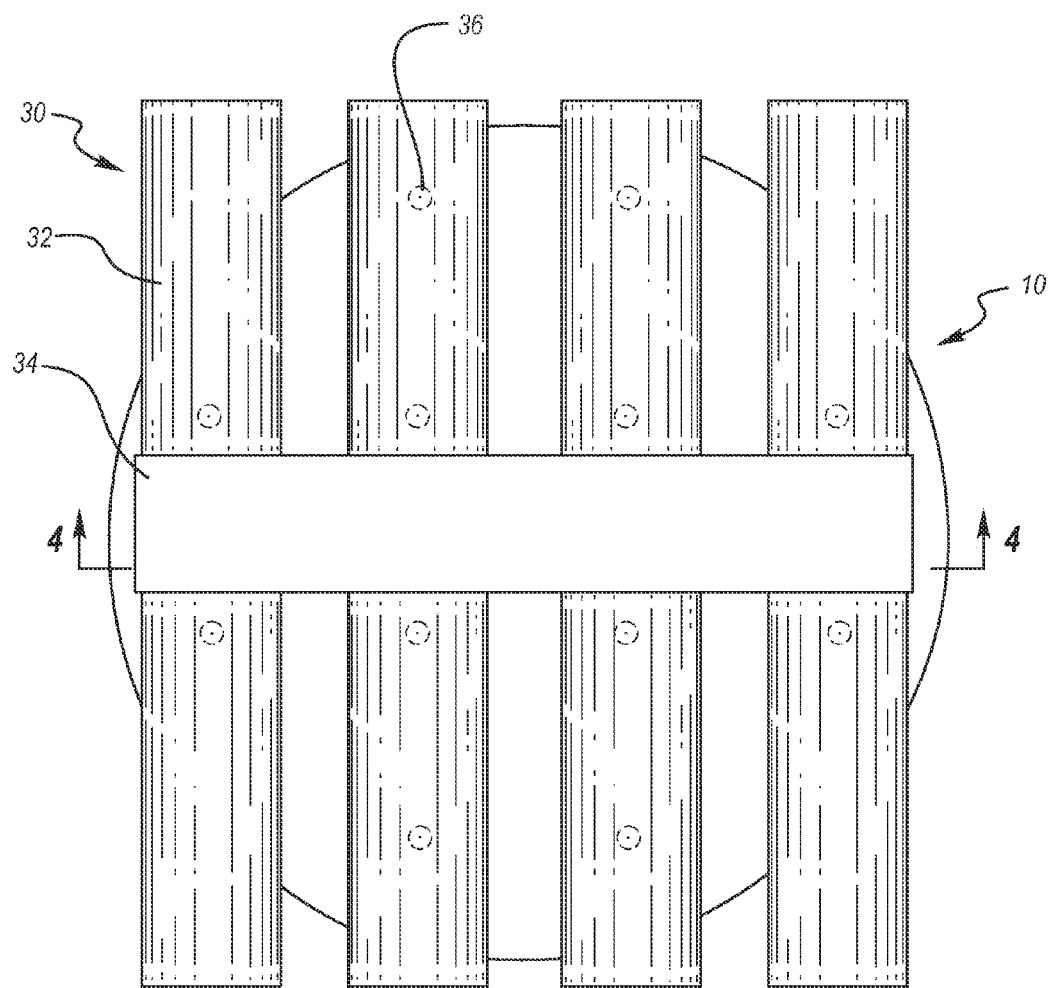
FIG. 3 is a top view of an implementation of a corrugated crust forming assembly.
Figure 4:
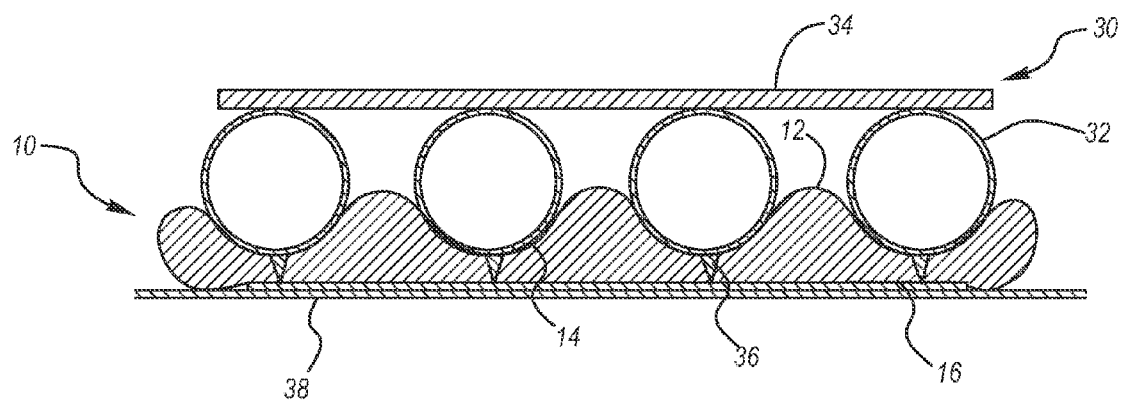
FIG. 4 is a cross-sectional side view of the corrugated crust forming assembly implementation of FIG. 3 taken along line 4-4 of FIG. 3.

Notwithstanding, turning to FIGS. 3-4 and for the exemplary purposes of this disclosure, forming assembly 30 is shown. Forming assembly 30 may provide for the proofing and cooking of a pizza crust for example. The crust 10 shown in FIGS. 3-4 is formed upside down.

Forming assembly 30 includes cross member 34. Parallel tubes 32 are also included and are separated by parallel spaces. Parallel tubes 32 and the parallel spaces are used to impart the grooves 14 and ridges 12 to the bottom surface of the crust 10. As the dough rises during the proofing stage, the parallel grooves 14 form around and adjacent to the exposed portions of the tubes 32 and the ridges 12 form by being allowed to extend in the spaces between the tubes 32. Parallel tubes 32 may either be coupled to cross member 34 by any of the manners described above (e.g., adhesive, welds, fasteners, etc.) or may be integrally formed with cross member 34. Protrusions 36 may be coupled to or integrally formed with parallel tubes 32 to stop the tubes 32 from contacting the plate 38 so that the crust 10 can have a thickness. Plate 38 opposes the parallel tubes 32 and forms the edge and recess 16 in the top surface of crust 10 as the crust 10 rises during proofing. At least one sidewall can also be included around plate 38 to support the dough thickness ultimately achieved. The sidewall or walls may be coupled to or integrally formed with an edge or edges of the plate 38 to form a pan or bowl or container shape.

Alternatively, a different mold may be used to form the crust 10 right side up. Such a mold may have an upper surface and a plurality of ridges extending upwardly from the upper surface. The ridges can be integral with the mold, or they can be separately coupled to vary the number of grooves imparted to the crust 10 by the mold.

USE

Implementations of corrugated crust forming assembly implementations and/or crust roller grill system implementations are particularly useful in pizza applications as previously explained. However, implementations are not limited to uses relating to pizzas. Rather, any description relating to pizza applications is for the exemplary purposes of this disclosure, and implementations may also be used in a variety of other food applications with similar results, such as with pastries, pies, hamburgers, sandwiches, tortas, tostadas, foccacia, flat bread, or any other food items with normally substantially flat crusts.

In places where the description above refers to particular implementations, it should be readily apparent that a number of modifications may be made without departing from the spirit thereof and that these implementations may be alternatively applied. The accompanying CLAIMS are intended to cover such modifications as would fall within the true spirit and scope of the disclosure set forth in this document. The presently disclosed implementations are, therefore, to be considered in all respects as illustrative and not restrictive, the scope of the disclosure being indicated by the appended CLAIMS rather than the foregoing DESCRIPTION. All changes that come within the meaning of and range of equivalency of the CLAIMS are intended to be embraced therein.

The invention claimed is:
1. A proofed, cooked corrugated dough crust comprising:
 a top surface; and
 a corrugated bottom surface sized and shaped to match rollers of a roller grill, the bottom surface opposing the top surface and defining one of:
  at least two parallel grooves sized and shaped to rest on top of the rollers separated by at least one parallel ridge sized and shaped to extend in a space between the rollers;
  at least two parallel ridges sized and shaped to extend in spaces between the rollers separated by at least one parallel groove sized and shaped to rest on top of the rollers; and
  at least one parallel ridge sized and shaped to extend in a space between the rollers.

2. The corrugated crust of claim 1 wherein the crust has a circular shape.

3. The corrugated crust of claim 1 wherein spacing between parallel grooves is about one inch to about one and three-quarters of an inch.

4. The corrugated crust of claim 1 wherein the parallel grooves and the parallel ridges comprise a plurality of parallel grooves and ridges in an alternating series.

5. The corrugated crust of claim 4 wherein spacing between parallel grooves is about one inch to about one and three-quarters of an inch and spacing between parallel ridges is about one inch to about one and three-quarters of an inch.

6. The corrugated crust of claim 1 wherein the parallel grooves extend about one quarter to about one half the way to the top surface of the crust.

7. The corrugated crust of claim 1 wherein the top surface comprises at least one outer edge defining a recess.

8. A roller grill system for a proofed, cooked corrugated dough crust comprising:
   a roller grill comprising a plurality of parallel rollers and spaces in an alternating series; and
   at least one corrugated crust comprising:
      a top surface; and
      a corrugated bottom surface in contact with the rollers of the roller grill, the bottom surface opposing the top surface and defining one of:
         at least two parallel grooves resting on top of the rollers separated by at least one parallel ridge extending in a space between the rollers;
         at least two parallel ridges extending in spaces between the rollers separated by at least one parallel groove resting on top of the rollers; and
         at least one parallel ridge extending in a space between the rollers.

9. The corrugated crust roller grill system of claim 8 wherein the crust has a circular shape.

10. The corrugated crust roller grill system of claim 8 wherein spacing between the parallel grooves is about one inch to about one and three-quarters of an inch.

11. The corrugated crust roller grill system of claim 8 wherein the parallel grooves and the parallel ridges comprise a plurality of parallel grooves and ridges in an alternating series.

12. The corrugated crust roller grill system of claim 11 wherein spacing between parallel grooves is about one inch to about one and three-quarters of an inch and spacing between parallel ridges is about one inch to about one and three-quarters of an inch.

13. The corrugated crust roller grill system of claim 8 wherein the parallel grooves extend about one quarter to about one half the way to the top surface of the crust.

14. The corrugated crust roller grill system of claim 8 wherein the parallel ridges extend into spaces between the rollers about one quarter to about one half of a diameter of a roller.

15. The corrugated crust roller grill system of claim 8 wherein the top surface comprises at least one outer edge defining a recess.

* * * * *